United States Patent Office 2,943,609
Patented July 5, 1960

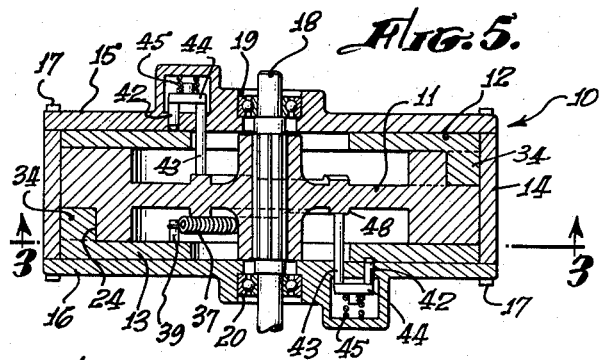
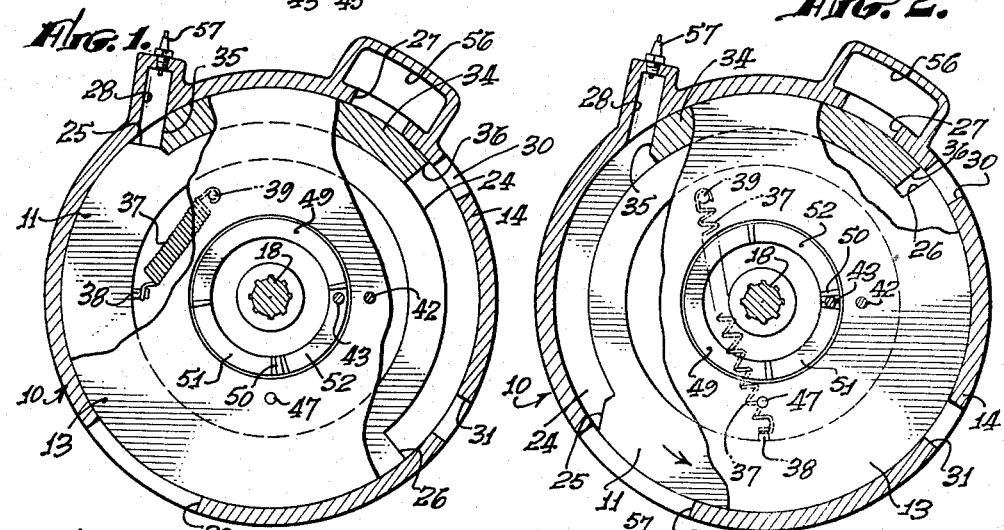
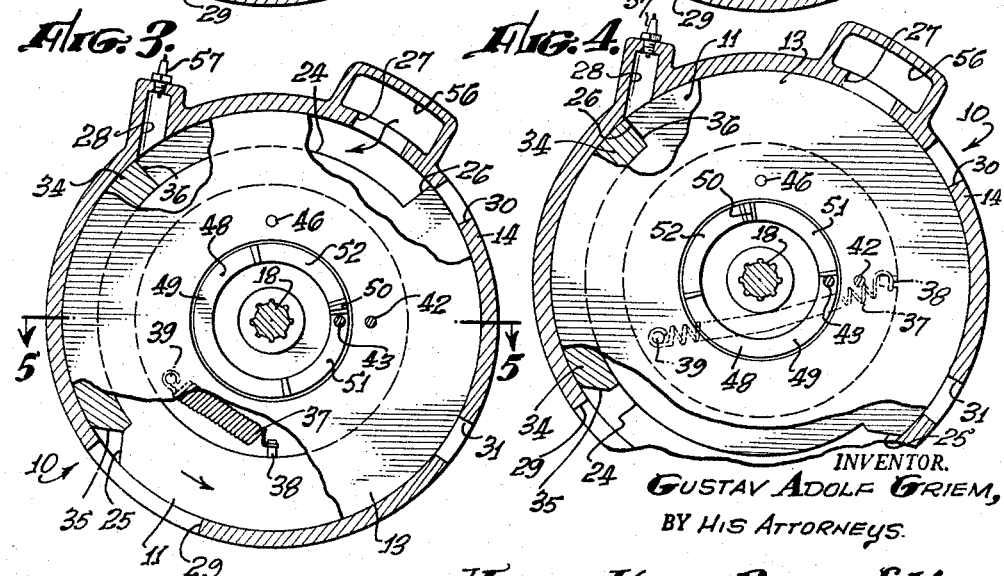

2,943,609

ROTARY ENGINE

Gustav Adolf Griem, 2986 Belden Drive,
Los Angeles, Calif.

Filed Sept. 28, 1959, Ser. No. 842,965

7 Claims. (Cl. 123—11)

This invention relates to internal combustion engines and the like and, in particular, to a rotary type of engine.

It is an object of the invention to provide a new and improved rotary engine suitable for use with gasoline and other fuels, the rotary engine avoiding the necessity for reciprocating parts, crankshafts, and the like, used in most conventional engines. A further object is to provide a rotary engine that is simple and efficient in operation and one that utilizes a minimum of moving parts.

It is an object of the invention to provide a rotary engine having a rotor which rotates at substantially constant speed in a cylindrical housing, the rotor having an arcuate piston space carrying an arcuate piston for rotation with the rotor, with the relative movement of the rotor and piston being controlled as a function of the rotor position to provide the fuel inlet, compression and exhaust functions. A further object is to provide such an engine which may utilize more than one piston with a single rotor providing the equivalent of a multi-cylinder engine.

Another object of the invention is to provide a rotary engine structure that can be adapted to compressor operation by driving the output shaft from an external source.

The invention also comprises novel details of construction and novel combinations and arrangements of parts, which will more fully appear in the course of the following description. The drawing merely shows and the description merely describes a preferred embodiment of the present invention which is given by way of illustration or example.

In the drawing:

Fig. 1 is a side view of a preferred embodiment of the invention with a portion of the structure broken away to show the internal arrangement;

Figs. 2, 3 and 4 are views similar to Fig. 1 showing the engine at different stages of the operating cycle; and Fig. 5 is a sectional view taken along the line 5—5 of Fig. 3.

The engine of the invention includes a housing 10, a rotor 11 and piston plates 12, 13. The housing is formed of a cylindrical case 14 having end plates 15, 16 attached thereto by screws 17. The rotor is mounted on a splined shaft 18 carried in bearings 19, 20 in the end plates 15, 16, respectively.

The construction of the piston plates 12, 13 is identical and only the latter will be described in detail. The engine can be manufactured with only a single piston plate if desired. However, the use of two pistons disposed opposite each other with respect to the operating cycle of the rotor provides an increased and smoother output from the engine.

A relieved section 24 is provided in the rotor 11 to serve as a piston space, this section having a forward end 25 and a rear end 26, the rotor rotating counter-clockwise as shown in Figs. 1–4. A fuel inlet opening 27, a fuel ignition opening 28 and an exhaust opening 29 are provided in the housing and are disposed to provide communication with the piston space when the rotor is appropriately oriented. One or more additional openings 30, 31 may be provided in the housing to eliminate pressure build-ups and vacuums in the area adjacent these openings. These openings play no part in the operating cycle of the engine. However, if desired, the piston and rotor can be used in conjunction with two such openings 30, 31 to function as an auxiliary compressor, providing a pressure source for supercharging, fuel injection, or other purposes.

An arcuate piston 34 is carried on the piston plate 13 and is disposed in the piston space of the rotor, the piston having a leading edge 35 and a trailing edge 36. The piston plate 13 is freely rotatable in the housing and is coupled to the rotor by a tension spring 37 fixed to a boss 38 on the rotor and a boss 39 on the piston plate. The spring 37 tends to make the piston rotate with the rotor, urging the leading edge 35 of the piston toward the forward end 25 of the piston space.

Means are provided for restraining movement of the piston during certain intervals of the rotor rotation cycle to provide the necessary fuel injection, compression and exhaust functions. A stop mechanism restricts movement of the piston with the stop mechanism being actuated by a timing mechanism as a function of the rotor movement. In the preferred embodiment illustrated herein, rods 42, 43 are joined by a bar 44 and are mounted in the end plate 16 for movement parallel to the axis of the rotor. A compression spring 45 urges the rods upward against the rotor 11 and piston plate 13, as seen in Fig. 5 and into the paper, as seen in Figs. 1–4. Openings 46, 47 are provided in the piston plate 13 for receiving the rod 42 and a cam 48 is provided on the rotor 11 for engagement with the rod 43. The cam 48 carries high sections 49, 50 and low sections 51, 52 for moving the rod 42 between the piston free and piston locked conditions, respectively.

A source of fuel, such as a carburetor, is connected to a passage 56 for supplying the fuel to the fuel inlet opening 27. Suitable means for igniting the compressed fuel, such as a spark plug 57, is mounted in the fuel ignition opening 28.

Referring to Fig. 1, the engine is shown with the fuel compressed into the fuel ignition opening 28. The rod 43 is engaging the low section 52 of the cam and the rod 42 is engaging the opening 46 of the piston plate, locking the piston relative to the housing. The compressed fuel is ignited and its combustion drives the rotor counter-clockwise, the piston being locked in position. The rotor rotates to the position shown in Fig. 2 with the piston space 24 in communication with the exhaust opening 29. At this time, the high section 50 of the cam moves the rod 42 out of engagement with the piston plate and the piston is rapidly rotated to the position of Fig. 3 by the spring 37.

This advancement of the piston drives the exhaust gases out through the exhaust opening and also draws in a fresh charge of fuel through the inlet opening. During this period, the piston moves approximately 90° while the rotor moves only a few degrees. The rod 43 now rides on the low section 51 of the cam and the rod 42 engages the opening 47 of the piston plate, again locking the piston plate relative to the housing. The rotor continues rotating to the position shown in Fig. 4, compressing the new fuel load into the compression opening. At this time, the rod 43 engages the high section 49 of the cam, freeing the piston to catch up with the rotor as the rotor moves to the position of Fig. 1. Then the cycle of operation is repeated.

The angular velocity of the rotor during the cycle of operation can be smoothed by using a conventional flywheel on the shaft 18 and by constructing the rotor with a flywheel form as seen in Fig. 5. Also, the provision of two pistons with two ignition openings adjusted to fire at opposite points of the cycle provides a smoother output. It should also be noted that the cycle of operation can be set to occur in a half revolution with two sets of inlet, compression and exhaust openings being provided to produce two firings per revolution of a piston. Similarly, three or more firings could be produced per revolution although the mechanical structure becomes exceedingly complicated.

The machine of the invention can be used as a compressor by driving the shaft 18 from an external source. The fluid to be compressed is drawn in through the inlet opening 27 in the same manner as a charge of fuel, and the compressed fluid is expelled through the ignition opening 28.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim as my invention:

1. In a rotary machine, the combination of: a cylindrical housing having a fluid inlet opening and a compression opening; a rotor journaled in said housing for rotation therein, said rotor having an arcuate piston space with a forward end and a rear end, with said space moving past said inlet and compression openings in sequence as said rotor rotates; an arcuate piston positioned in said piston space for rotation relative to said housing, said piston occupying a lesser arc than said piston space for oscillation therein, and having a leading edge and a trailing edge; means coupling said piston to said rotor for urging said leading edge of said piston toward said forward end of said space; stop means for restricting rotation of said piston for an interval during a revolution of said rotor; and timing means for actuating said stop means so that said piston is stopped with said trailing edge adjacent said compression opening while the fluid is being compressed into said compression opening by said rotor.

2. In a rotary engine, the combination of: a cylindrical housing having a fuel inlet opening, a fuel ignition opening and an exhaust opening; a rotor journaled in said housing for rotation therein, said rotor having an arcuate piston space with a forward end and a rear end, with said space moving past said inlet, ignition and exhaust openings in sequence as said rotor rotates; an arcuate piston positioned in said piston space for rotation relative to said housing, said piston occupying a lesser arc than said piston space for oscillation therein, and having a leading edge and a trailing edge; means coupling said piston to said rotor for urging said leading edge of said piston toward said forward end of said space; stop means for restricting rotation of said piston at selected intervals during a revolution of said rotor; and timing means for actuating said stop means so that said piston is stopped with said trailing edge adjacent said ignition opening while the fuel is being compressed into said ignition opening and is stopped with said leading edge adjacent said ignition opening when the fuel is ignited.

3. In a rotary engine, the combination of: a cylindrical housing having a fuel inlet opening, a fuel ignition opening and an exhaust opening; a rotor journaled in said housing for rotation therein, said rotor having an arcuate piston space concentrically disposed on said axis, said space having a forward end and a rear end, with said space moving past said inlet, ignition and exhaust openings in sequence as said rotor rotates; an arcuate piston positioned in said piston space for rotation relative to said housing, said piston occupying a lesser arc than said piston space for oscillation therein, and having a leading edge and a trailing edge; a tension spring coupled between said piston and said rotor for urging said leading edge of said piston toward said forward end of said space; stop means mounted on said housing and engaging said piston for restricting rotation of said piston at selected intervals relative to the angular position of said rotor; and timing means for actuating said stop means so that said piston is stopped with said trailing edge adjacent said ignition opening while the fuel is being compressed into said ignition opening by rotation of said rotor closing the space between said trailing edge and said rear end and is stopped with said leading edge adjacent said ignition opening when the fuel is ignited.

4. In a rotary engine, the combination of: a cylindrical housing having a fuel inlet opening, a fuel ignition opening and an exhaust opening; a rotor journaled in said housing for rotation therein, said rotor having an arcuate piston space with a forward end and a rear end, with said space moving past said inlet, ignition and exhaust openings in sequence as said rotor rotates; an arcuate piston positioned in said piston space for rotation relative to said housing, said piston occupying a lesser arc than said piston space for oscillation therein, and having a leading edge and a trailing edge; means coupling said piston to said rotor for urging said leading edge of said piston toward said forward end of said space; stop means for restricting rotation of said piston at selected intervals during a revolution of said rotor; and a timing cam carried on said rotor and in engagement with said stop means in driving relationship for stopping said piston with said trailing edge adjacent said ignition opening while the fuel is being compressed into said ignition opening and stopping said piston with said leading edge adjacent said ignition opening when the fuel is ignited.

5. In a rotary engine, the combination of: a cylindrical housing having first and second fuel inlet openings, fuel ignition openings and exhaust openings; a rotor journaled in said housing for rotation therein, said rotor having first and second arcuate piston spaces disposed on opposite sides thereof, each of said spaces having a forward end and a rear end, with each of said spaces moving past the corresponding inlet, ignition and exhaust openings in sequence as said rotor rotates; a first arcuate piston positioned in said first piston space for rotation relative to said housing, said first piston occupying a lesser arc than said first piston space for oscillation therein, and having a leading edge and a trailing edge; a second arcuate piston positioned in said second piston space for rotation relative to said housing, said second piston occupying a lesser arc than said second piston space for oscillation therein, and having a leading edge and a trailing edge; first means coupling said first piston to said rotor for urging the leading edge thereof toward said forward end of said first piston space; second means coupling said second piston to said rotor for urging the leading edge thereof toward said forward end of said second piston space; first stop means for restricting rotation of said first piston at selected intervals during a revolution of said rotor; second stop means for restricting rotation of said second piston at selected intervals during a revolution of said rotor; and timing means for actuating each of said stop means so that each of said pistons is stopped when its trailing edge is adjacent the corresponding ignition opening while the fuel is being compressed into such ignition opening and is stopped with its leading edge adjacent its corresponding ignition opening when the fuel is ignited.

6. In a rotary engine, the combination of: a cylindrical housing having a fuel inlet opening, a fuel ignition opening and an exhaust opening in the periphery thereof; a rotor mounted in said housing for rotation therein, said rotor having a portion of the periphery thereof relieved providing an arcuate piston space concentrically disposed about the axis of said rotor, said space having a forward end and a rear end, with said space moving past said inlet, ignition and exhaust openings in sequence as said rotor rotates; a piston plate mounted in said housing between said rotor and an end of said housing for rotation therein, said piston plate carrying an arcuate piston projecting into said piston space and occupying a lesser arc than said piston space for oscillation therein, and having a leading edge and a trailing edge; means coupling said piston plate to said rotor for urging said leading edge of said piston toward said forward end of said space; stop means for restricting rotation of said piston plate at selected intervals during a rotation cycle of said rotor; and timing means for actuating said stop means so that said piston plate is stopped with said trailing edge adjacent said ignition opening while the fuel is compressed into said ignition opening and is stopped with said leading edge adjacent said ignition opening when the fuel is ignited.

7. In a rotary engine, the combination of: a cylindrical housing having a fuel inlet opening, a fuel ignition opening, an exhaust opening and first and second compressor openings; a rotor journaled in said housing for rotation therein, said rotor having an arcuate piston space with a forward end and a rear end, with said space moving past said inlet, ignition, exhaust and first and second openings in sequence as said rotor rotates; an arcuate piston positioned in said piston space for rotation relative to said housing, said piston occupying a lesser arc than said piston space for oscillation therein, and having a leading edge and a trailing edge; means coupling said piston to said rotor for urging said leading edge of said piston toward said forward end of said space; stop means for restricting rotation of said piston at selected intervals during a revolution of said rotor; and timing means for actuating said stop means so that said piston is stopped with said trailing edge adjacent said ignition opening while the fuel is being compressed into said ignition opening and is stopped with said leading edge adjacent said ignition opening and said trailing edge adjacent said second compressor opening when the fuel is ignited.

References Cited in the file of this patent

UNITED STATES PATENTS

| | | |
|---|---|---|
| 1,481,220 | Nichols | Jan. 15, 1924 |
| 2,673,027 | Lipkan | Mar. 23, 1954 |

FOREIGN PATENTS

| | | |
|---|---|---|
| 353,590 | Germany | May 23, 1922 |